United States Patent [19]

Shitanoki

[11] 4,245,864
[45] Jan. 20, 1981

[54] LIFTING DEVICE IN VEHICLE SLIDING ROOF DEVICE

[75] Inventor: Kazuaki Shitanoki, Saitama, Japan

[73] Assignee: Honda Giken Kogyo Kabushiki Kaisha, Tokyo, Japan

[21] Appl. No.: 72,576

[22] Filed: Sep. 5, 1979

[30] Foreign Application Priority Data

Sep. 6, 1978 [JP] Japan .................... 53/122604[U]
Sep. 8, 1978 [JP] Japan .................... 53/123255[U]

[51] Int. Cl.³ ............................................. B60J 7/10
[52] U.S. Cl. ................................................ 296/222
[58] Field of Search ............ 296/137 E, 137 Q, 137 H

[56] References Cited

U.S. PATENT DOCUMENTS

| | | | |
|---|---|---|---|
| 2,968,514 | 1/1961 | Golde | 296/137 E |
| 3,055,701 | 9/1962 | Golde | 296/137 E |
| 3,290,087 | 12/1966 | Werner | 296/137 E |
| 3,333,889 | 8/1967 | Golde | 296/137 E |
| 3,863,979 | 2/1975 | Bienert | 296/137 E |

Primary Examiner—Robert R. Song
Attorney, Agent, or Firm—Irving M. Weiner; Pamela S. Burt; John L. Shortley

[57] ABSTRACT

A lifting device in a vehicle sliding roof device, wherein a link mechanism which connects the stay of a slide roof member to a slider slidably disposed on a guide rail is provided with a regulating member, and the guide rail is provided with a constraining member which constrains the lifting of the regulating member in association with the link mechanism. A cut-away portion for permitting vertical motion of the regulating member is provided at a slide roof member lifting position on the constraining member of the guide rail, and a lift guide is adjustably provided in the vicinity of such cut-away portion. In this manner, the slide roof member is lifted only at the position wherein the roof opening is closed, to thereby prevent the slide roof member from being lifted unexpectedly at a position other than such closed position.

9 Claims, 11 Drawing Figures

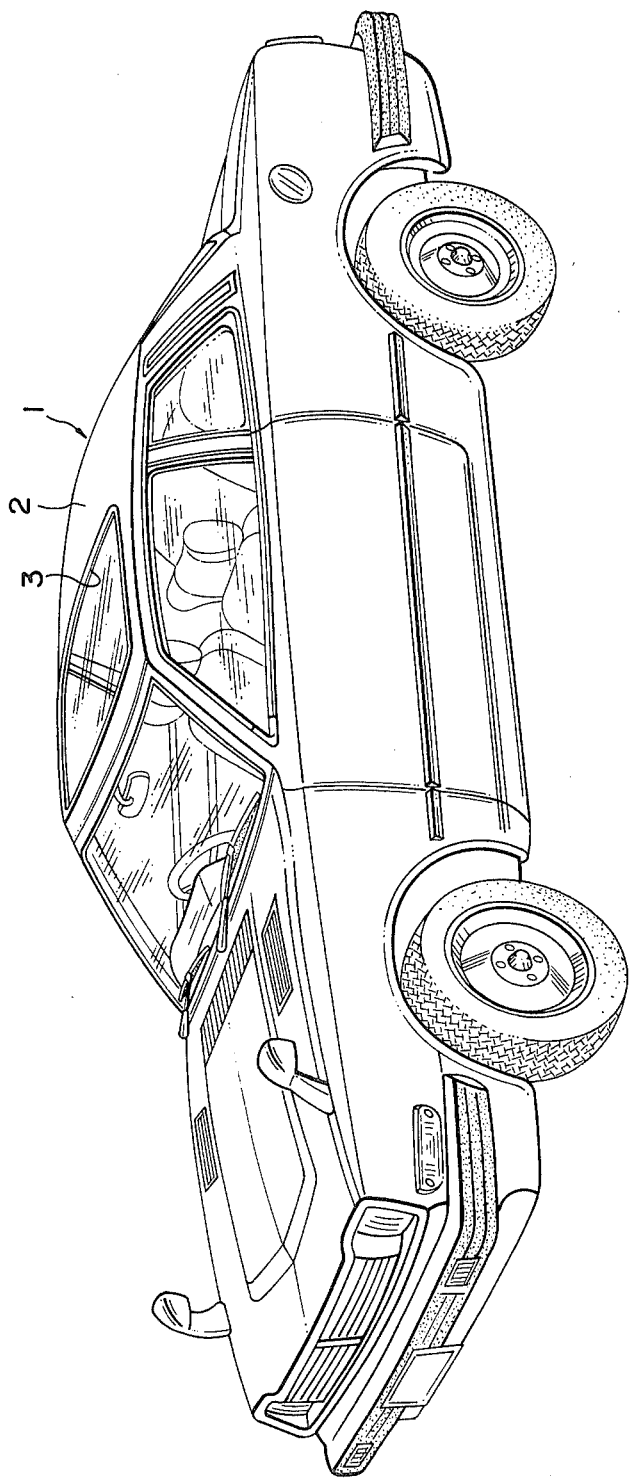

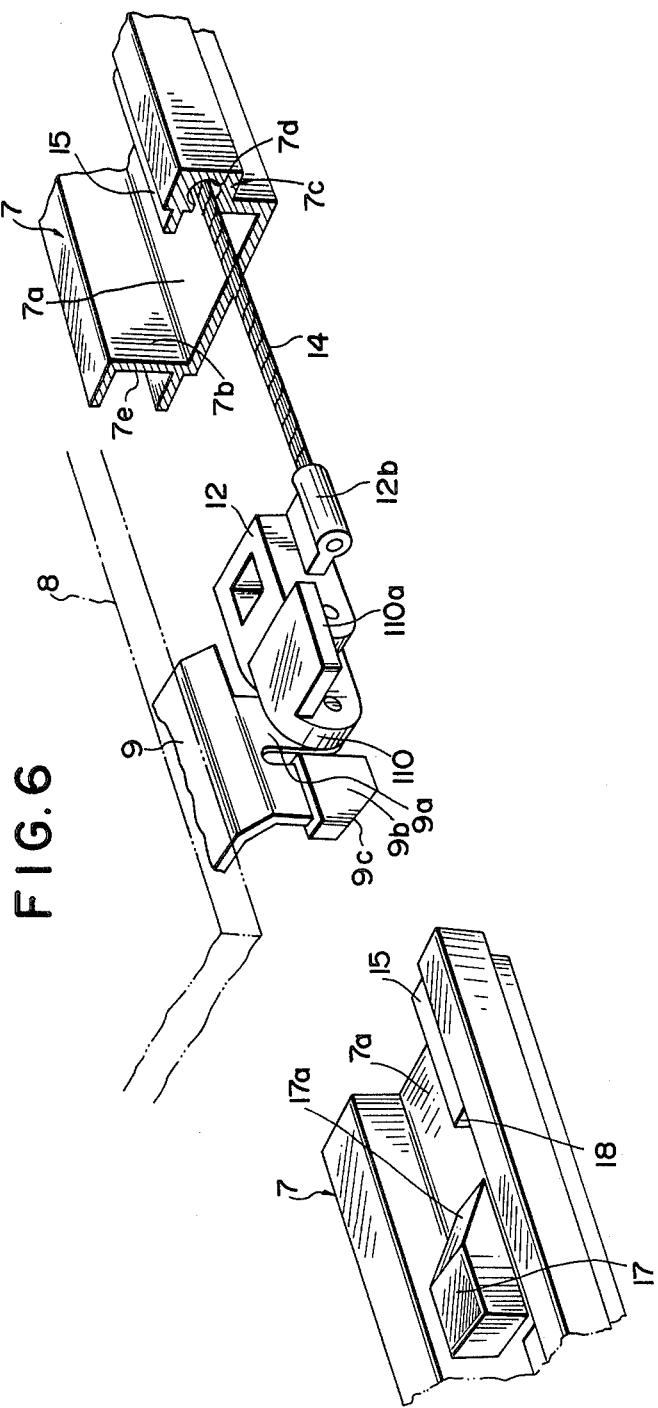

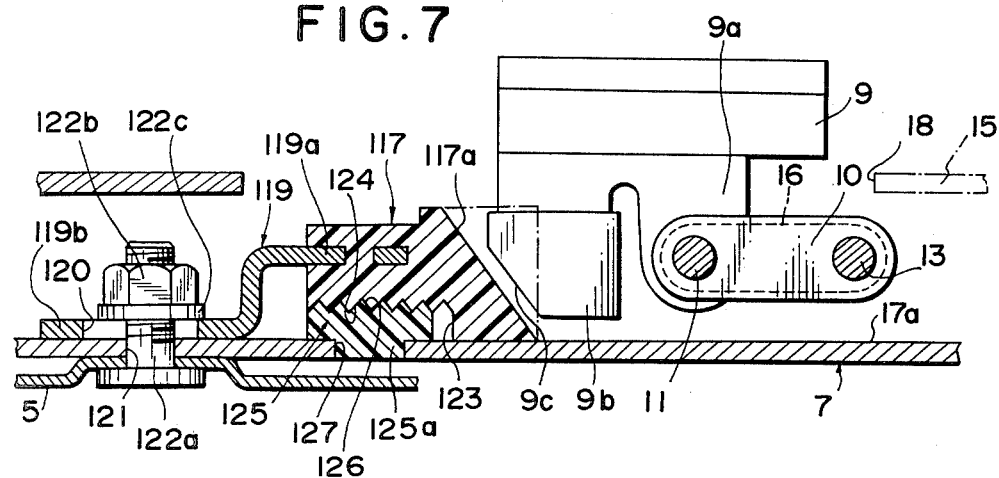
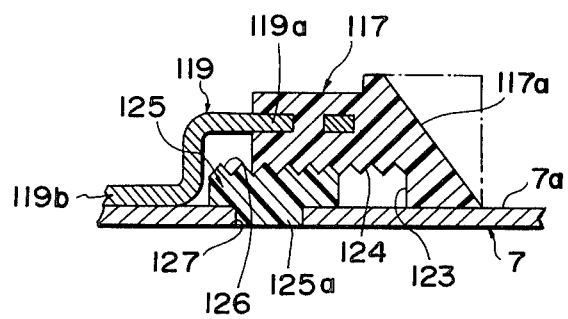
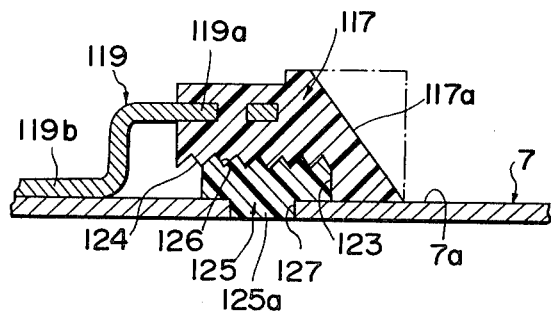

LIFTING DEVICE IN VEHICLE SLIDING ROOF DEVICE

BACKGROUND OF THE INVENTION

1. Field of the Invention

The present invention relates to a lifting device employed in a sliding roof device for a vehicle, in which lifting of the slide roof member is permitted only when the slide roof member reaches its forwardmost position wherein the roof opening is closed.

2. Description of Relevant Art

There is known a sliding roof device in which an opening formed in the roof of a vehicle is selectively opened and closed with a slide roof member which is moved forwardly and rearwardly with the aid of a guide rail assembly.

In such a sliding roof device, the slide roof member is moved downwardly and stored below the vehicle roof behind the opening when the opening is uncovered or open. When the opening is covered or closed, the slide roof member is moved upwardly so that the periphery of the slide roof member is brought into close contact with the periphery of the opening, so as to seal the opening in an air-tight manner. For this purpose, the sliding roof device is provided with means for moving the slide roof member up and down to open and close the opening in the vehicle roof.

A conventional sliding roof device is so designed that a spring means is interposed between the stay of the slide roof member and a member sliding along the guide rail to pull the slide roof member downwardly. The slide roof member is moved upwardly against the elastic force of the spring means at the position wherein the opening is closed.

In the conventional sliding roof device, the slide roof member is pulled by the spring means as described above, and therefore the elastic force of the spring means acts on the various components thereof, resulting in increased frictional resistance which interrupts smooth operation. Further, it is difficult to simplify the construction due to the provision of the spring mechanism.

The most serious problem attendant the conventional sliding roof device resides in the fact that while the slide roof member is being moved forwardly to close the opening, the slide roof member may be abruptly stopped, or an abnormal condition may occur to cause the slide roof member to move upwardly at a position other than the predetermined position.

As a result of extensive research regarding the aforesaid problem associated with a conventional lifting device for the slide roof member in a sliding roof device, the present invention has been arrived at to effectively solve the shortcomings and problems associated with such conventional lifting device.

SUMMARY OF THE INVENTION

The present invention provides a lifting device in a vehicle sliding roof device, in which a stay of a slide roof member is coupled through a link assembly to a slider which is slid on a guide rail. The link assembly is provided with a lifting regulating member, and the guide rail is provided with a lifting constraining member operatively associated with the regulating member. The lifting constraining member of the guide rail is provided therein at the slide roof member lifting position with a cut-away portion which permits vertical movements of the regulating member, and a lift guide member is provided in the vicinity of such cut-away portion.

An object of the invention is to provide a lifting device in a vehicle sliding roof device which is simple in construction, and in which unexpected lifting of the slide roof member at a position other than the position of the aforesaid cut-away portion is positively prevented, so as to protect the slide roof member. Further, smooth opening and closing of the vehicle roof opening by means of the slide roof member is effectively ensured.

Another object of the invention is to provide a lifting device in a vehicle sliding roof device which comprises a lift guide adjusting device in which the lift guide is provided in the vicinity of the aforesaid cut-away portion formed in the guide rail assembly, such that the mounting position of the lift guide can be adjusted forwardly or rearwardly with respect to the guide rail assembly. The thus-adjusted mounting position of the lift guide can be securely maintained.

The above and further objects, advantages, and details of the present invention will become apparent from the following detailed description when read in conjunction with the accompanying drawings, wherein like parts are designated by like reference numerals.

BRIEF DESCRIPTION OF THE DRAWINGS

FIG. 5 is a perspective view of a vehicle provided with a sliding roof device.

FIG. 6 is a perspective view showing a second embodiment of the lifting device according to the invention.

FIG. 7 is a view showing the lifting device provided with a lift guide adjusting device.

FIGS. 8 and 9 are views illustrating a method of adjusting the mounting position of the lift guide member.

DETAILED DESCRIPTION OF PREFERRED EMBODIMENTS

Figure 2:
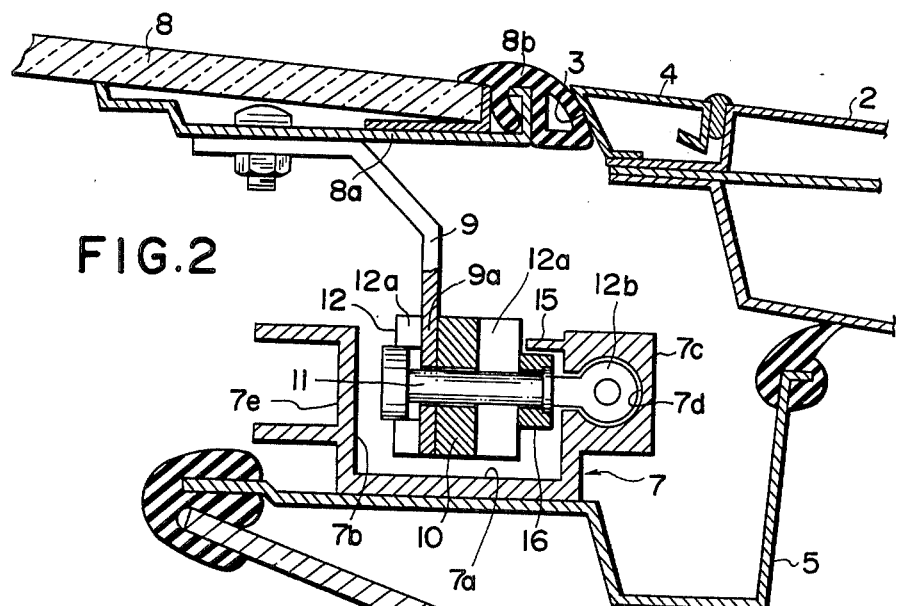
FIG. 2 is an enlarged sectional view of the essential components of the FIG. 1 lifting device.

With reference to FIG. 5, there is shown an opening 3 formed in the front portion of the roof 2 of a vehicle 1. As shown in FIG. 2, a roof molding 4 is provided along the periphery of opening 3. Provided below opening 3 is a slide roof frame 5 below which a lining 6 is provided in such a manner as to be visible in the ceiling of the vehicle interior. A guide rail 7 is provided on frame 5, below opening 3.

Figure 1:
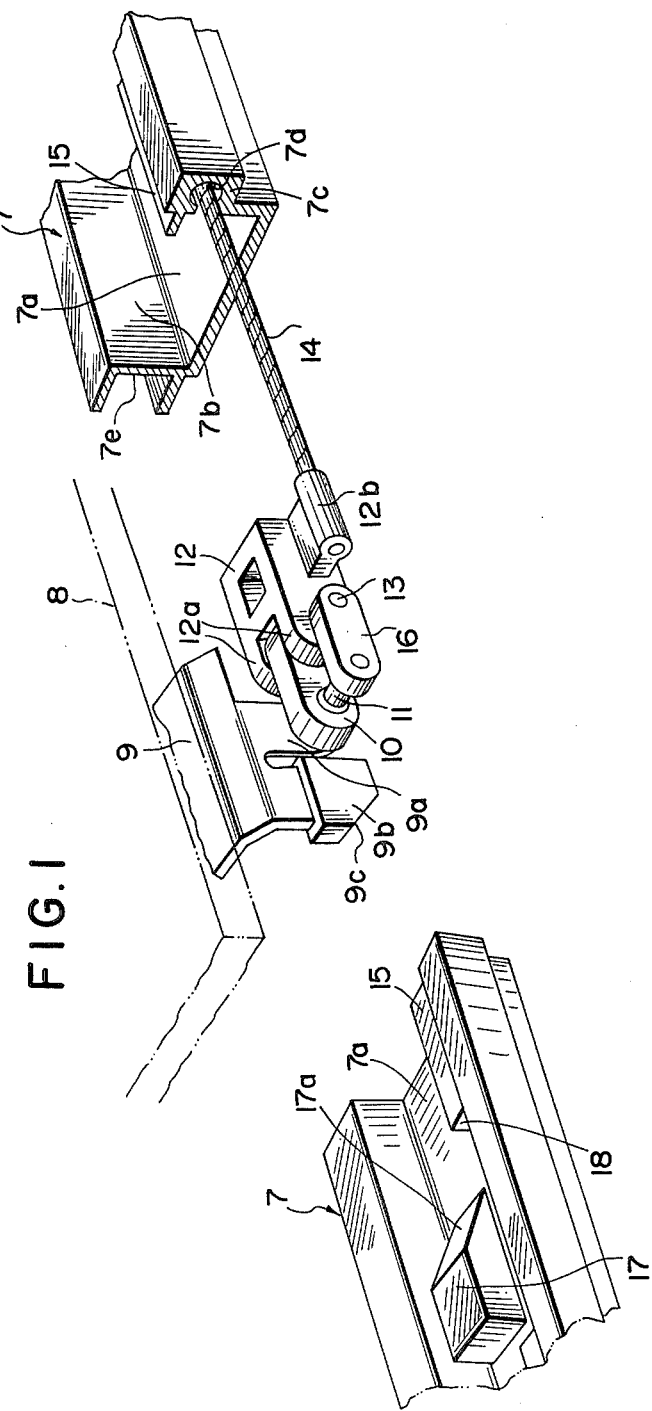
FIG. 1 is a perspective view showing a first embodiment of a lifting device in accordance with the present invention.

The guide rail 7, as shown in FIGS. 1 and 2, comprises a guide groove 7a which opens upwardly, and inner and outer side walls 7b and 7c, respectively. The outer side wall 7c includes a cable guide groove 7d extending longitudinally along the entire length thereof. The groove 7d includes a slit which faces sidewardly and inwardly, the slit being narrower than the width of groove 7d. The inner side wall 7b is provided with a groove 7e for guiding the side edge of a sun shade (not shown) which faces sidewardly on the vehicle interior side of wall 7b.

L-shaped stays 9 are mounted by brackets 8a (FIG. 2) on both sides of a glass plate roof member 8 in such a manner that stays 9 are extended substantially downwardly. The bracket 8a also serves as a holder for holding a sealing member made of rubber or the like which is provided along roof member 8. The extended end portion of stay 9 is connected to one end portion of a lift-up link 10 by means of a pin 11. The other end portion of link 10 is disposed between two branches 12a, 12a of a slider 12 which is fitted in groove 7a of rail 7, and link 10 is coupled to slider 12 by means of a pin 13. A bracket 12b is extended from the outer wall of slider 12. The front end of a cable 14 is fastened to bracket 12b. The bracket 12b is engaged with cable guide groove 7d formed in the outer wide wall 7c of rail 7.

The cable 14 is driven by an electric motor or the like (not shown) to cause bracket 12b, and accordingly slider 12, to slide along rail 7. As the slider 12 is slid in such a manner, the slide roof member 8 connected through stay 9 to slider 12 is slid to open and close the roof opening 3.

A constraining piece 15 is extended from the inner surface of the outer side wall 7c of guide rail 7, above groove 7d, in such a manner that constraining piece 15 is disposed longitudinally of outer side wall 7c of groove 7a.

A regulating link 16 is disposed on the outer side of lift-up link 10. One end portion of link 16 is coupled to pin 11, and the other end portion thereof is coupled to pin 13, such that link 16 is parallel to link 10.

A cut-away portion 18 is provided on constraining piece 15 at a position from which slide roof member 8 is lifted to close opening 3, i.e., at a position before the position where a lift guide member 9b, extended downwardly from the front portion of stay 9, strikes against a lift guide member 17 provided in groove 7a of rail 7. In this connection, the front surface of lift guide member 9b defines a sloped guide cam surface 9c, while the mating surface of lift guide member 17 defines a sloped guide cam surface 17a which corresponds to sloped guide cam surface 9c of lift guide member 9b.

The link 16 is arranged below constraining piece 15 so that link 16 is constrained by constraining piece 15. The cut-away portions 18 are provided at two positions in constraining piece 15, and are extended over a necessary length thereof.

In operation, the slide roof member 8 is moved back and forth while being guided by rail 7, with the aid of cable 14, slider 12, link 10 and stay 9, to open and close the roof opening 3. When roof member 8 is moved forwardly, i.e., when roof member 8 is moved to close opening 3, slider 12 is pushed by means of cable 14, as a result of which link 10 is pushed so as to be moved upwardly. Accordingly, when the forward movement of slide roof member 8 is resisted by a force or an obstruction for some reason, the link 10 tends to lift the slide roof member 8, including stay 9. However, in such case, regulating link 16 acts on constraining piece 15, i.e., regulating link 16 is constrained by constraining piece 15 as a result of which the turning of link 10 is prevented. Thus, the lifting of slide roof member 8 is prevented. Accordingly, slide roof member 8 cannot be lifted at a position other than the predetermined position. Thus, damage to roof member 8, opening 3 and sealing member 8b, which might otherwise result if slide roof member 8 is lifted at a position other than the predetermined position, will be effectively prevented.

Figure 3:
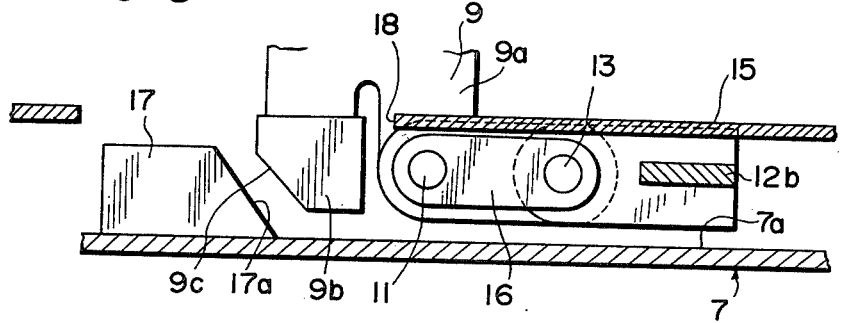
FIG. 3 is a view illustrating operation of the lifting device.
Figure 4:
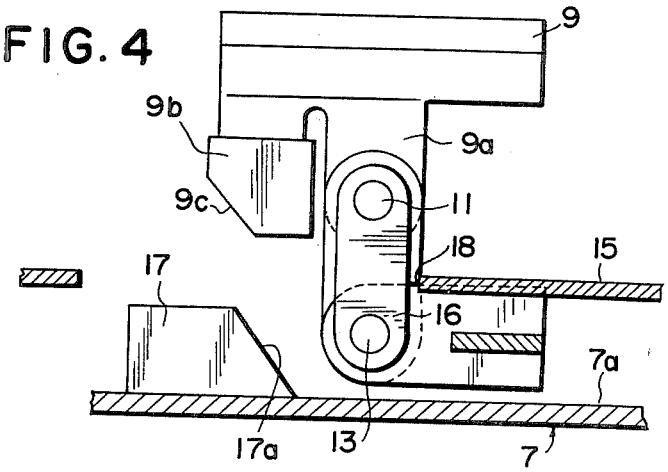
FIG. 4 is a view illustrating the lifting operation of the lifting device.

When the slide roof member 8 has moved to the forward limit of its movement, lift guide member 9b of stay 9 strikes against lift guide member 17. As a result, the slide roof member 8 with stay 9 is pushed upwardly by the cooperation of cam surfaces 9c and 17a, so that link 10 is turned to be upright, thus tending to lift the roof member 8. At this position, the cut-away portion 18 is provided in constraining piece 15, such that even if regulating link 16 together with link 10 rises at this position, link 16 is not constrained by constraining piece 15. Thus, the lifting of slide roof member 8 is permitted, as shown in FIGS. 3 and 4.

The above-described first embodiment employing lift-up link 10 with regulating link 16 may be modified in accordance with a second embodiment of the invention as shown in FIG. 6.

In the embodiment shown in FIG. 6, a flange 110a is extended from the upper part of the outside surface of a lift-up link 110 in such a manner that it may be received under constraining piece 15, and link 110 is constrained by constraining piece 15. In this embodiment, the same action as that of the above-described regulating link 16 is affected by flange 110a.

The mounting position of guide member 17 on rail 7 must be adjusted or shifted forwardly or rearwardly by taking into consideration the position thereof relative to opening 3 and slide roof member 8, so as to compensate for tolerances caused during manufacturing and mounting of the various components of the device. Such adjustment may be achieved by mounting lift guide member 17 on an elongated hole formed in rail 7, and then fastening member 17 to rail 7 at the predetermined suitable position with screws. However, such method is unsatisfactory due to the fact that whenever slide roof member 8 is opened and closed, lift guide member 9b is caused to strike against member 17, so that member 17 is loosened and shifted. If this problem occurs, the slide roof member 8 cannot be lifted at the predetermined suitable position, and thus the opening 3 cannot be closed completely with slide roof member 8. To overcome such problem, a novel lift guide member as shown in FIG. 7 is provided in accordance with the present invention.

The lift guide member 117 is molded of a synthetic resin having a small coefficient of friction, with the front part thereof having a sloped surface 117a. A stay 119 is extended behind guide member 117, in such a manner that the end portion 119a of stay 119 is embedded in guide member 117. The stay 119 is bent in an L-shape behind guide member 117 and has a mounting portion 119b extended on groove 7a of guide rail 7. The mounting portion 119b is provided with an elongated hole 120 in the middle portion thereof. A mounting hole 121 is formed in the bottom of groove 7a of guide rail 7. The stay 119 is fixedly mounted on rail 7 with a bolt 122a inserted into holes 120 and 121 through frame 5 under rail 7, and secured with a nut 122b and washer 122c, as a result of which guide member 117 is also fixed. Thus, guide member 117 connected to say 119 can be moved forwardly or rearwardly by sliding stay 119 along elongated hole 120.

A recess 123 is formed in a part of the lower surface of guide member 117. A number of teeth 124 are continuously formed in the lower surface of recess 123 in such a manner that teeth 124 are arranged in the widthwise direction of the lower surface of recess 123. A guide setting member 125 engaging recess 123 is provided on the bottom of groove 7a of rail 7. Teeth 126 are formed in the upper surface of guide setting member 125, and engage teeth 124. The guide setting member 125 has a locking piece 125a protruded downwardly, so that member 125 is fixedly secured to rail 7 by press-fitting locking piece 125a in a mounting hole 127 formed in the bottom of groove 7a of rail 7.

The mounting position of lift guide member 117 is adjusted by moving it along the elongated hole 120 in stay 119. Because teeth 124 of guide member 117 are engaged with teeth 126 of guide setting member 125, it is necessary to disengage teeth 124 from teeth 126 by lifting guide member 117 before the mounting position of guide member 117 is determined. Thus, adjustment of the mounting position of guide member 117 depends on the pitch of teeth 124 and 126; however, the pitch is so very small that substantially no problem is encountered in this regard.

After completion of the adjustment of the mounting position, the bolt and nut are tightened to fixedly mount guide member 117 on rail 7, with teeth 124 of guide member 117 engaged with teeth 126 of guide setting member 125. Thus, guide member 117 is fixedly secured at the predetermined position. Accordingly, even if lift guide member 9b of slide roof member 8 strikes against guide member 117 repeatedly, the guide member 117 will never be shifted in the direction of impact. Further, even if bolt 122a inserted into elongated hole 120 is loosened, movement of guide member 117 is prevented by guide setting member 125. In the foregoing manner, guide member 117 will remain fixed in its mounted position once it has been set at the desired predetermined position.

FIGS. 8 and 9 show re-set mounting positions of guide member 117. As shown, the mounting position of guide member 117 can be changed as desired within the allowable range of engagement of teeth 124 and 126.

Figure 10:
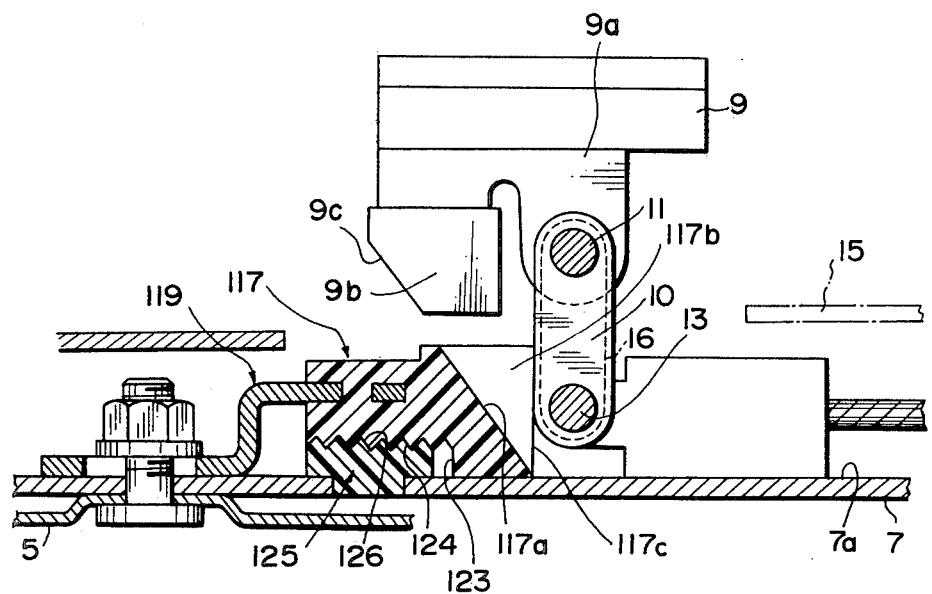
FIG. 10 is a view showing the lift guide adjusting device in combination with the lift-up guide member of a stay provided for a slide roof member.
Figure 11:
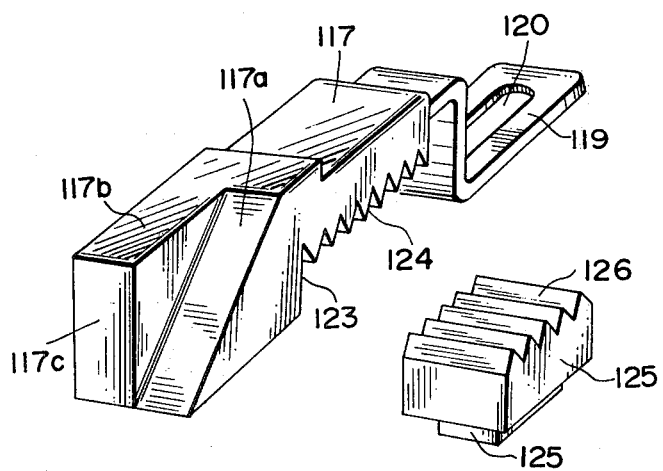
FIG. 11 is a perspective view showing the body of the lift guide adjusting device.

With reference to FIGS. 10 and 11, there is shown a stopper 117b provided on one side of sloped surface 117a of lift guide member 117, stopper 117b being formed integrally with member 117. The slope 117a occupies substantially one-half of the width of guide member 117, while the stopper 117b occupies the remaining half. The stopper 117b includes a stopping wall 117c which is formed vertically at the rear end adjacent to the lowest edge of sloped surface 117a.

As lift guide member 9b of stay 9 strikes against sloped surface 117a of lift guide member 117, stay 9 is lifted to turn the links 10 and 16, as a result of which the slide roof member 8 is lifted. In this operation, when stay 9 reaches its upper limit along the sloped surface 117a, the lift-up link 10 is positioned upright and strikes against the wall 117c of stopper 117b as shown in FIG. 10, thus stopping the forward movement of stay 9. In this case, the link 10 and lift guide member 9b are shifted in the widthwise direction. Thus, the lift guide member 117 also serves as a stopper, so as to regulate the forward movement of slide roof member 8. Accordingly, it is possible not only to adjust the lift guide position of slide roof member 8, but also to define the limit of forward movement of roof member 8, so as to prevent the front edge of roof member 8 from striking against the front edge of opening 3. Thus, it is possible to prevent damage to roof member 8, opening 3, and the sealing member.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

I claim:

1. A lifting device in a sliding roof device for a vehicle, comprising:
a slide roof member provided with at least one stay;
a lift-up link;
a guide rail having a slider slidably disposed thereon;
said stay being coupled through said lift-up link to said slider slidably disposed on said guide rail;
said lift-up link being provided with a lifting regulating member;
said guide rail being provided with a lifting constraining member operatively associated with said regulating member;
said lifting constraining member of said guide rail being provided therein at the slide roof member lifting position thereof with a cut-away portion for permitting substantially vertical movement of said regulating member; and
a first lift guide member provided on said guide rail in the vicinity of said cut-away portion of said lifting constraining member.

2. A lifting device according to claim 1, wherein:
said regulating member comprises a regulating link which is pivoted and coaxially coupled to said lift-up link in substantially parallel relation to said lift-up link.

3. A lifting device according to claim 1, wherein:
said regulating member comprises a flange-like extension which extends from said lift-up link.

4. A lifting device according to claim 1, wherein:
said constraining member comprises a constraining piece which protrudes longitudinally inwardly from a side wall of a groove of said guide rail; and
said regulating member is disposed below said constraining piece such that said regulating member is constrained by said constraining piece.

5. A lifting device according to claim 1, wherein:
said stay of said slide roof member is provided with a second lift guide member having a sloped surface;
said first lift guide member provided on said guide rail is disposed at the slide roof member lifting position on the bottom of a guide groove of said guide rail; and
said first lift guide member includes a sloped surface corresponding to said sloped surface of said second lift guide member of said stay.

6. A lifting device according to claim 1, wherein:
said first lift guide member is mounted such that the mounting position thereof is adjustable in the direction of slide of said slide roof member;
a plurality of first teeth are formed in a portion of the lower surface of said first lift guide member;
a guide setting member is provided on said guide rail, said guide setting member including on the upper surface thereof second teeth which engage said first teeth; and said first lift guide member is engaged with said guide setting member by means of said first and second teeth when said first lift guide member is disposed in an adjusted mounting position.

7. A lifting device according to claim 6, wherein:
said first lift guide member is provided with a stay having an elongated hole which permits adjustment of the mounting position of said first guide member on said guide rail.

8. A lifting device according to claim 5 or 6, wherein: said first lift guide member includes a sloped surface against which said second guide member of said stay of said slide roof member strikes; and
a stopper is provided, said stopper comprising a substantially vertical wall against which said lift-up link strikes, and said slope surface and said stopper being disposed substantially adjacent to each other in the widthwise direction thereof.

9. A lifting device according to claim 8, wherein:
said second lift guide member provided on said stay of said slide roof member and said lift-up link are disposed substantially parallel to each other in the widthwise direction thereof.

* * * * *